United States Patent
Kase (10) Patent No.: US 11,176,356 B2
(45) Date of Patent: *Nov. 16, 2021

(54) FACE AUTHENTICATION DEVICE HAVING DATABASE WITH SMALL STORAGE CAPACITY

(71) Applicant: NEC Corporation, Tokyo (JP)

(72) Inventor: Takayuki Kase, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/128,712

(22) Filed: Sep. 12, 2018

(65) Prior Publication Data
US 2019/0012523 A1 Jan. 10, 2019

Related U.S. Application Data

(63) Continuation of application No. 15/933,723, filed on Mar. 23, 2018.

(30) Foreign Application Priority Data

Mar. 27, 2017 (JP) .............................. JP2017-060863

(51) Int. Cl.
*G06K 9/00* (2006.01)

(52) U.S. Cl.
CPC ..... *G06K 9/00255* (2013.01); *G06K 9/00281* (2013.01); *G06K 9/00288* (2013.01)

(58) Field of Classification Search
None
See application file for complete search history.

(56) References Cited

U.S. PATENT DOCUMENTS

| 7,602,947 | B1 | 10/2009 | Lemelson et al. |
| 10,044,985 | B1* | 8/2018 | Parker ............... H04N 5/22541 |
| 2008/0158357 | A1 | 7/2008 | Connell et al. |

(Continued)

FOREIGN PATENT DOCUMENTS

| JP | H11-032178 A | 2/1999 |
| JP | 2000-250116 A | 9/2000 |

(Continued)

OTHER PUBLICATIONS

U.S. Office Action, for U.S. Appl. No. 15/933,723 dated Jun. 10, 2019.

(Continued)

*Primary Examiner* — David Perlman
(74) *Attorney, Agent, or Firm* — sughrue Mion, PLLC (57) ABSTRACT

Face authentication can easily be performed based on an input image including a mirror region reflected by a mirror without increasing a storage capacity of a database. With the database, for each face of a person to be authenticated, only one real front image is to be registered as a reference face image. A mirror image processing circuitry detects the mirror region from the input image and to subject a detected mirror region to lateral inversion processing to produce a processed image. A face detection processing circuitry detects a face image from the processed image to generate a detected face image. A face authentication processing circuitry compares the detected face image with the reference face image, to thereby perform face authentication.

12 Claims, 6 Drawing Sheets

(56) References Cited

U.S. PATENT DOCUMENTS

| | | |
|---|---|---|
| 2009/0135253 A1 | 5/2009 | Augst |
| 2011/0187861 A1 | 8/2011 | Totani |
| 2013/0147711 A1 | 6/2013 | Njolstad et al. |
| 2013/0329971 A1 | 12/2013 | Oddou et al. |
| 2014/0146152 A1 | 5/2014 | Frashure |
| 2015/0113634 A1 | 4/2015 | Mau |
| 2015/0123991 A1 | 5/2015 | Yarosh et al. |
| 2015/0189158 A1 | 7/2015 | Hailey |
| 2016/0295197 A1 | 10/2016 | Hudman et al. |
| 2017/0206691 A1* | 7/2017 | Harrises ............ G02B 27/0172 |
| 2019/0005607 A1 | 1/2019 | Tamai |

FOREIGN PATENT DOCUMENTS

| | | |
|---|---|---|
| JP | 2004-102513 A | 4/2004 |
| JP | 2005-234999 A | 9/2005 |
| JP | 2006-099615 A | 4/2006 |
| JP | 2007-011456 A | 1/2007 |
| JP | 2007-172509 A | 7/2007 |
| JP | 2007-206834 A | 8/2007 |
| JP | 2013-150171 A | 8/2013 |
| JP | 2014-106816 A | 6/2014 |

OTHER PUBLICATIONS

Japanese Office Action for JP Application No. 2017-060863 dated Mar. 28, 2018 with English Translation.

U.S. Office Action for U.S. Appl. No. 15/933,723 dated Dec. 12, 2019.

U.S. Office Action for U.S. Appl. No. 16/128,688 dated Aug. 28, 2019.

U.S. Office Action for U.S. Appl. No. 16/128,688 dated Aug. 19, 2020.

U.S. Notice of Allowance for U.S. Appl. No. 16/127,737 dated Aug. 21, 2020.

U.S. Office Action for U.S. Appl. No. 15/933,723 dated Oct. 29, 2020.

U.S. Office Action for U.S. Appl. No. 16/128,688 dated Mar. 2, 2021.

U.S. Office Action for U.S. Appl. No. 15/933,723 dated May 13, 2021.

U.S. Office Action for U.S. Appl. No. 15/933,723 dated Sep. 8, 2021.

* cited by examiner

FACE AUTHENTICATION DEVICE HAVING DATABASE WITH SMALL STORAGE CAPACITY

The present application is a continuation application of U.S. patent application Ser. No. 15/933,723 filed on Mar. 23, 2018, which claims the benefit of priority from Japanese Patent Application 2017-060863 filed on Mar. 27, 2017, the disclosures of all of which are incorporated in their entirety by reference herein.

BACKGROUND OF THE INVENTION

Field of the Invention

This invention relates to a face authentication device, a face authentication method, and a face authentication program.

Description of the Related Art

In order to achieve a high authentication accuracy in a face authentication technology, it is required to photograph a face from a position as close to the front of the face as possible. However, in particular, a camera for monitoring is installed in the vicinity of a ceiling in many cases, and hence it is difficult for the camera to capture the face from the front.

The authentication accuracy can be expected to be improved by setting an angle, distance, height, or the like of a camera with respect to an object as recommended. However, when a camera is installed in, for example, a narrow floor or passage, there is a case in which the angle, distance, height, or the like of a camera cannot be set as recommended depending on the environment in which the camera is installed and it is consequently difficult to perform face authentication.

Meanwhile, in order to solve such a problem, there have been proposed various face authentication technologies that use a mirror. There have been known, as such face authentication technologies that use a mirror, for example, a technology requiring a front face image, a reflected face image, and a reflected side image to be registered with a database in advance, and a technology involving performing authentication processing without distinguishing between a real image and a reflected image. However, with such face authentication technologies that use a mirror, there is a fear that a person whose face image is similar to the laterally-inverted face image may be erroneously authenticated.

For example, in Japanese Unexamined Patent Application Publication (JP-A) No. 2014-106816, there is disclosed a technology involving installing a front mirror and a mirror that is inclined at a small angle with respect to the front mirror, and picking up a reflected front image and a reflected side image with a camera, to thereby improve an accuracy of face authentication for entry and exit of a room.

In Japanese Unexamined Patent Application Publication (JP-A) No. 2007-011456, there is disclosed a technology involving picking up a front image of a face and right and left side images thereof, which are reflected by two mirrors, with a wide-angle camera, and determining whether a person to be authenticated is successfully authenticated through use of those picked-up images. Also in Japanese Unexamined Patent Application Publication (JP-A) No. 2007-011456, in the same manner as in Japanese Unexamined Patent Application Publication (JP-A) No. 2014-106816, a front image of a face of a person to be authenticated and right and left side images thereof are registered with a storage as registered information.

In Japanese Unexamined Patent Application Publication (JP-A) No. 2006-099615, there is disclosed a technology involving using only a face image reflected by a mirror for authentication.

In Japanese Unexamined Patent Application Publication (JP-A) No. 2007-206834, there is disclosed a technology involving extracting a face image in which a person to be authenticated faces the front from among face images of the person to be authenticated, which are acquired through reflection from a plurality of mirrors, to thereby perform face authentication of the person to be authenticated.

Meanwhile, in Japanese Unexamined Patent Application Publication (JP-A) No. 2000-250116, there is disclosed a technology involving laterally inverting image data on a person image (image data on a person image containing a person laterally inverted by a reflection mirror), which is generated by an image pickup camera, with an image inversion processor, to thereby convert the image into an original image.

However, the above-mentioned technologies disclosed in Japanese Unexamined Patent Application Publication (JP-A) Nos. 2014-106816, 2007-011456, 2006-099615, 2007-206834, and 2000-250116 have the following problems.

In the technology disclosed in Japanese Unexamined Patent Application Publication (JP-A) No. 2014-106816, the reflected front image and the reflected side image as well as the real front image are registered with the database for face authentication, and hence three face images are required to be registered for each person to be authenticated. This increases the storage capacity of the database threefold. In addition, in Japanese Unexamined Patent Application Publication (JP-A) No. 2014-106816, there is no definition of a method of detecting a mirror, and image correction suited to an angle and distortion of the mirror is not performed. Moreover, in the technology disclosed in Japanese Unexamined Patent Application Publication (JP-A) No. 2014-106816, there is a fear that, when a person to be authenticated does not stand still, the reflected front image and the reflected side image cannot be distinguished from each other.

Also in the technology disclosed in Japanese Unexamined Patent Application Publication (JP-A) No. 2007-011456, the front image of the face of the person to be authenticated and the right and left side images thereof are registered with the storage as the registered information, and hence the storage capacity of the database is increased threefold.

In the technologies disclosed in Japanese Unexamined Patent Application Publication (JP-A) Nos. 2006-099615 and 2007-206834, there is a fear that a person whose face image is similar to the laterally-inverted face image may be erroneously authenticated.

In Japanese Unexamined Patent Application Publication (JP-A) No. 2000-250116, there is merely disclosed the technology involving inverting again a picked-up image containing a person laterally inverted by the reflection mirror to convert the image into the original image.

SUMMARY OF THE INVENTION

It is an object of this invention is to provide a face authentication device, a face authentication method, and a non-transitory computer readable recording medium storing a face authentication program, which are capable of solving the above-mentioned problems.

One example embodiment according to this invention is a face authentication device, which is configured to perform face authentication based on an input image picked up by an image pickup device, the input image including a mirror region reflected by a mirror. The face authentication device comprises: a database with which, for each face of a person to be authenticated, only one real front image is to be registered as a reference face image; a mirror image processing circuitry configured to detect the mirror region from the input image and to subject a detected mirror region to lateral inversion processing to produce a processed image; a face detection processing circuitry configured to detect a face image from the processed image to generate a detected face image; and a face authentication processing circuitry configured to compare the detected face image with the reference face image, to thereby perform face authentication.

In addition, another example embodiment according to this invention is a face authentication method for performing face authentication based on an input image including a mirror region reflected by a mirror. The face authentication method comprising: registering, for each face of a person to be authenticated, only one real front image with a database as a reference face image; subjecting the mirror region of the input image to lateral inversion processing to produce a processed image; detecting a face region from the processed image to generate a detected face image; and comparing the detected face image with the reference face image, to thereby perform face authentication.

Furthermore, another example embodiment according to this invention is a non-transitory computer readable recording medium storing a face authentication program for causing a computer to execute face authentication based on an input image including a mirror region reflected by a mirror. The face authentication program causing the computer to execute: a registration procedure of registering, for each face of a person to be authenticated, only one real front image with a database as a reference face image; a mirror image processing procedure of subjecting the mirror region of the input image to lateral inversion processing to produce a processed image; a face detection processing procedure of detecting a face region from the processed image to generate a detected face image; and a face authentication processing procedure of comparing the detected face image with the reference face image, to thereby perform face authentication.

According to this invention, the face authentication can easily be performed based on the input image including the mirror region reflected by the mirror without increasing the storage capacity of the database.

DESCRIPTION OF THE EMBODIMENTS

Related Art

In order to facilitate understanding of this invention, the related art will be described first.

In order to achieve a high authentication accuracy in a face authentication technology, it is required to photograph a face from a position as close to the front as possible. However, in particular, a camera for monitoring is installed in the vicinity of a ceiling in many cases, and hence it is difficult for the camera to capture the face from the front.

The authentication accuracy can be expected to be improved by setting an angle, distance, height, or the like of a camera with respect to an object as recommended. However, when a camera is installed in, for example, a narrow floor or passage, there is a case in which the angle, distance, height, or the like of a camera cannot be set as recommended depending on the environment in which the camera is installed and it is consequently difficult to perform face authentication.

Figure 1A:
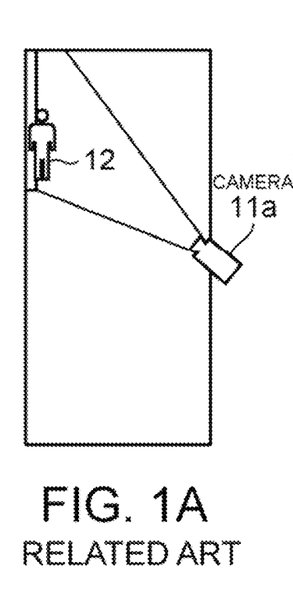
FIG. 1A and FIG. 1B are each an explanatory diagram of a camera arrangement in face authentication.
Figure 1B:
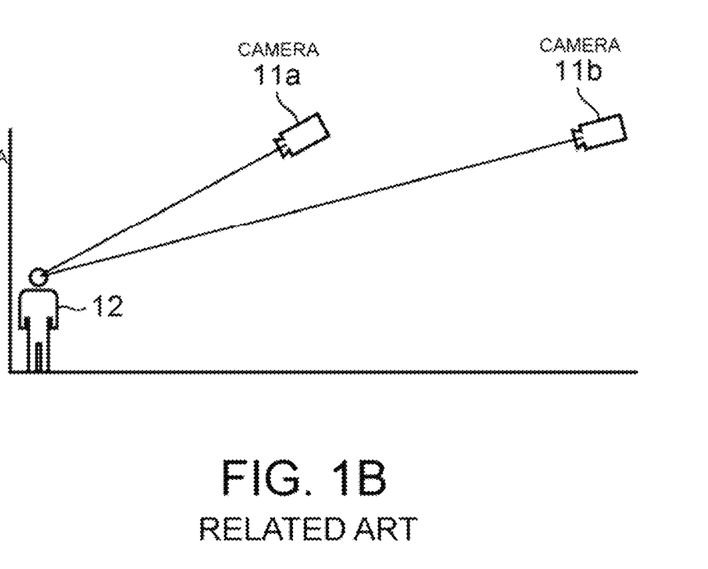

For example, such camera arrangements as illustrated in FIG. 1A and FIG. 1B to be used in face authentication are considered. FIG. 1A is an aerial view, and FIG. 1B is a side view.

A case is considered in which, in monitoring performed in such a narrow floor as illustrated in the aerial view of FIG. 1A, a camera 11a is installed so as to be aligned with a flow line direction of a person. When a person to be photographed 12 is to be photographed from the position of the camera 11a, a distance between the camera 11a and the person to be photographed 12 (hereinafter referred to as "photographing distance") is not sufficient, and hence the person to be photographed 12 cannot be photographed at a recommended angle of the camera 11a with respect to an object.

In other words, in order to achieve recommended settings for the camera 11a illustrated in the side view of FIG. 1B, a certain distance, for example, the distance between a camera 11b and the person to be photographed 12, is required.

Now, an example embodiment of this invention will be described with reference to the drawings. It is to be understood that the technical scope of this invention is not limited to the example embodiment, and is to be interpreted based on the description of the appended claims.

Example Embodiment

Next, the example embodiment of this invention will be described.

In order to increase the accuracy of the face authentication in such a narrow floor as illustrated in FIG. 1A, it is required to increase the photographing distance. Thus, in this example embodiment, the following method is adopted: a camera is arranged so as to face a mirror, and a person to be photographed reflected by the mirror is photographed with the camera, to thereby increase the photographing distance.

It is assumed in this example embodiment that a face authentication system is for monitoring, and is thus also applicable to a case in which faces of a plurality of persons on a mirror are detected.

When a real image and a reflected image are acquired at the same time, in this example embodiment, a mirror region is automatically detected to determine whether or not a face image is required to be subjected to correction and inversion processing. With this, images for which a plurality of angles are specified, such as a reflected front image and a reflected side image, are not required, and hence it is only required to register one front face image for each face of a person to be photographed with a database for face authentication.

Next, features of the example embodiment of this invention will be described.

In this example embodiment, through use of reflection by a mirror, it is possible to increase a face authentication accuracy and also increase a degree of freedom of a position at which the camera is installed. In particular, a feature of this example embodiment resides in that a logic of determining whether or not face image inversion processing is required when a real image and a reflected image are acquired at the same time is introduced.

Figure 2:
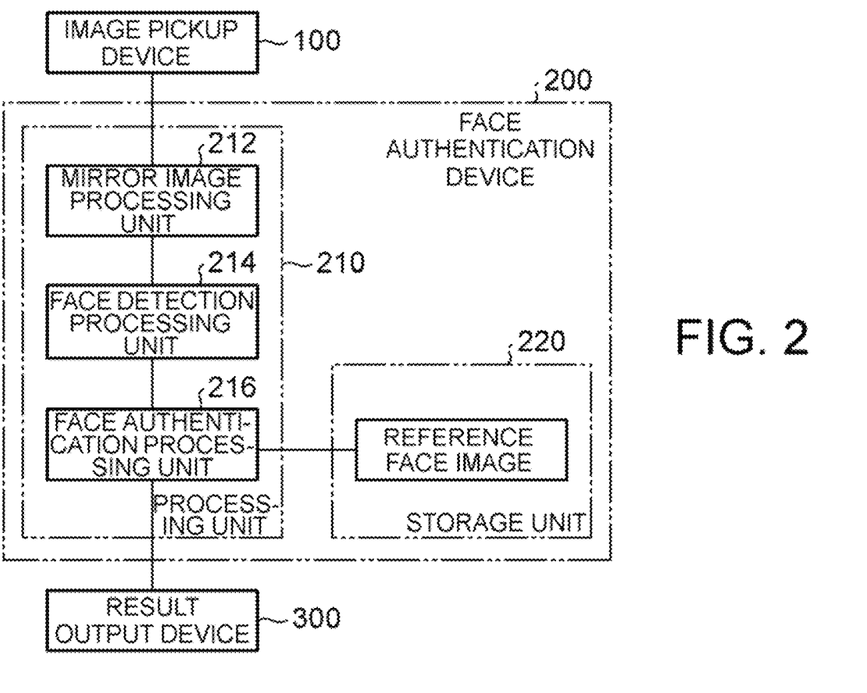
FIG. 2 is a block diagram of a face authentication system including a face authentication device according to an embodiment of this invention.

Referring to FIG. 2, a description will be given of a face authentication system including a face authentication device according to the example embodiment of this invention.

The face authentication system comprises an image pickup device 100, a face authentication device 200, and a result output device 300.

The image pickup device 100 picks up an input image including a mirror region reflected by a mirror. The face authentication device 200 receives the input image picked up by the image pickup device 100, and supplies an authenticated result to the result output unit 300.

The face authentication device 200 includes a processing unit 210 and a storage unit 220.

The storage unit 220 comprises a storage device including, for example, a hard disk drive or a non-volatile memory. The storage unit 220 serves as a database with which, for each face of a person to be authenticated, only one real front image is to be registered as a reference face image.

The processing unit 210 comprises a mirror image processing unit 212, a face detection processing unit 214, and a face authentication processing unit 216.

The mirror image processing unit 212 detects the mirror region in the input image, and subjects a detected mirror region to lateral inversion processing to produce a processed image.

The face detection processing unit 214 detects a face image from the processed image to generate a detected face image.

The face authentication processing unit 216 compares the detected face image with the reference face image stored in the storage unit 200, to thereby perform face authentication.

Figure 3:
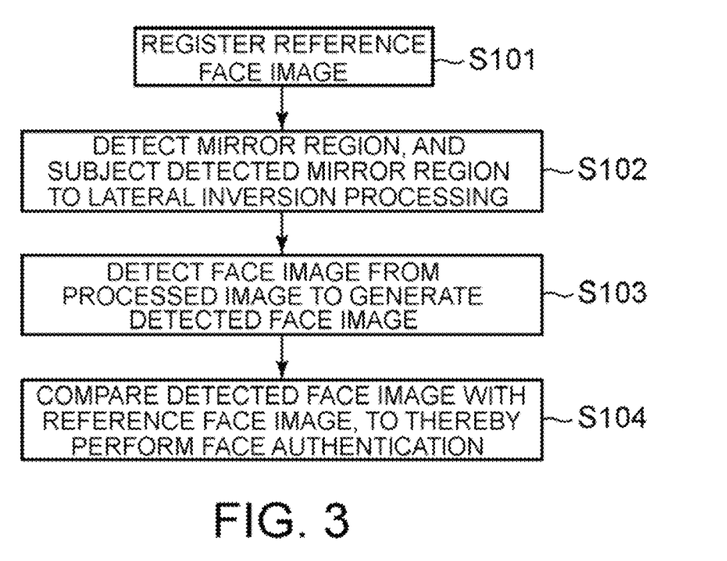
FIG. 3 is a flowchart for illustrating an operation of the face authentication device illustrated in FIG. 2.

Next, referring to FIG. 3, a description will be given of an operation of the face authentication device 200 illustrated in FIG. 2.

First, in the face authentication device 200, for each face of a person to be authenticated, only one real front image is registered with the storage unit 220 in advance as a reference face image (Step S101).

Next, the mirror image processing unit 212 detects the mirror region in the input image picked up by the image pickup device 100, and subjects the detected mirror region to lateral inversion processing to produce the processed image (Step S102).

The face detection processing unit 214 detects a face image from the processed image to generate the detected face image (Step S103).

Then, the face authentication processor 216 compares the detected face image with the reference face image stored in the storage unit 200, to thereby perform face authentication (Step S104).

The face authentication device 200 configured as described above produces the following effect.

Specifically, the effect of this example embodiment is as follows: the face authentication can easily be performed based on the input image including the mirror region without increasing the storage capacity of the database. This is because the mirror region is subjected to the lateral inversion processing, which eliminates the necessity to register a face image subjected to lateral inversion with the database.

The respective components of the face authentication device 200 are only required to be implemented through use of a combination of hardware and software. In a mode in which hardware and software are combined, a face authentication program is loaded onto a random access memory (RAM), and a control unit (central processing unit (CPU)) and other hardware are caused to operate based on the face authentication program, to thereby implement each component as corresponding means. Further, the face authentication program may be recorded in a recording medium for distribution. The face authentication program recorded in the recording medium is read into a memory in a wired or wireless manner, or via the recording medium itself, to cause the control unit and the like to operate. Examples of the recording medium include an optical disc, a magnetic disk, a semiconductor memory device, and a hard disk.

When the above-mentioned example embodiment is described in another expression, the example embodiment can be implemented by causing a computer, which is to be caused to operate as the face authentication device 200, to operate as the mirror image processing unit 212, the face detection processing unit 214, and the face authentication processing unit 216 based on the face authentication program loaded on the RAM.

First Example

Now, referring to the accompanying drawings, a first example of this invention will be described.

Figure 4:
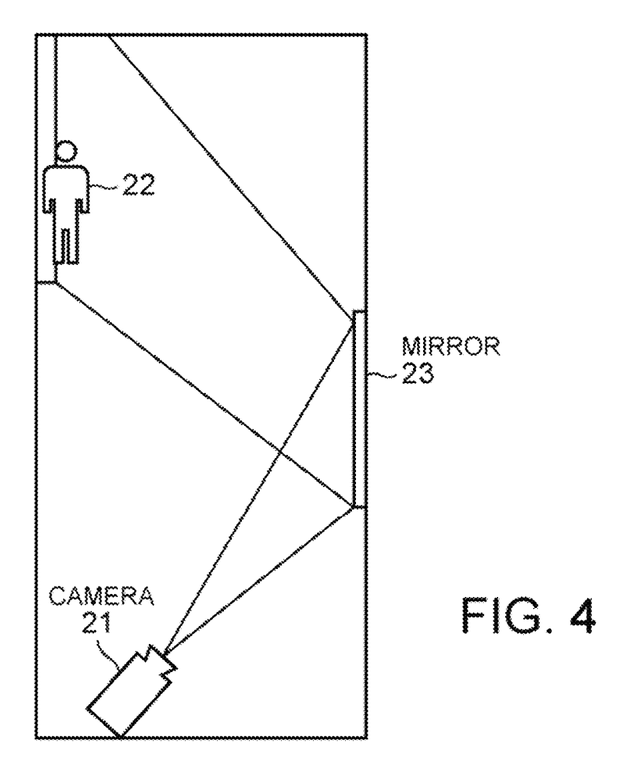
FIG. 4 is an explanatory diagram of a camera arrangement that uses a mirror.
Figure 5:
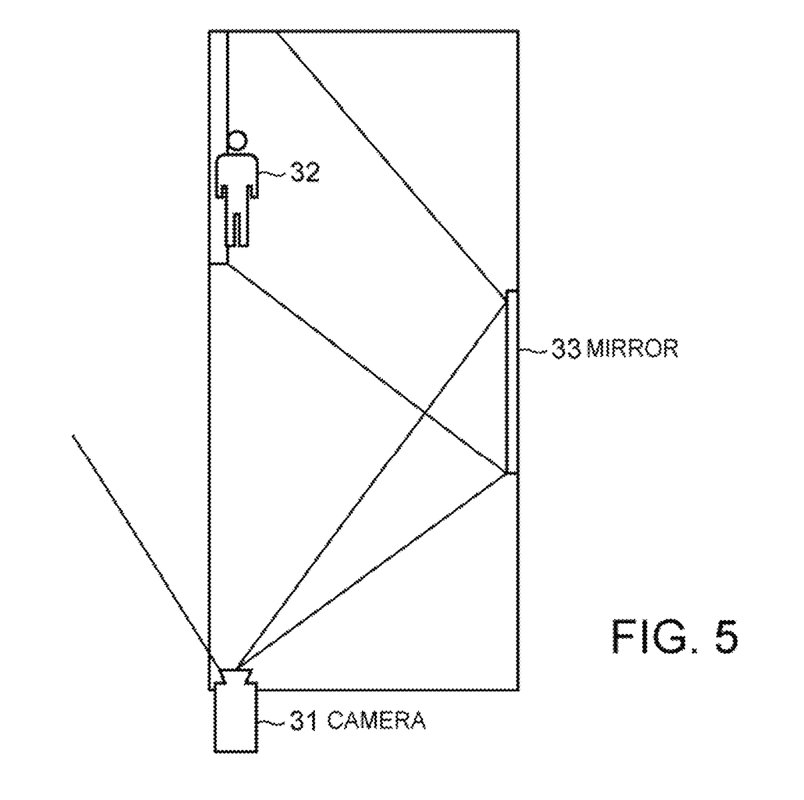
FIG. 5 is an explanatory diagram of a camera arrangement that uses a mirror and allows face authentication to be performed from a plurality of directions.
Figure 6:
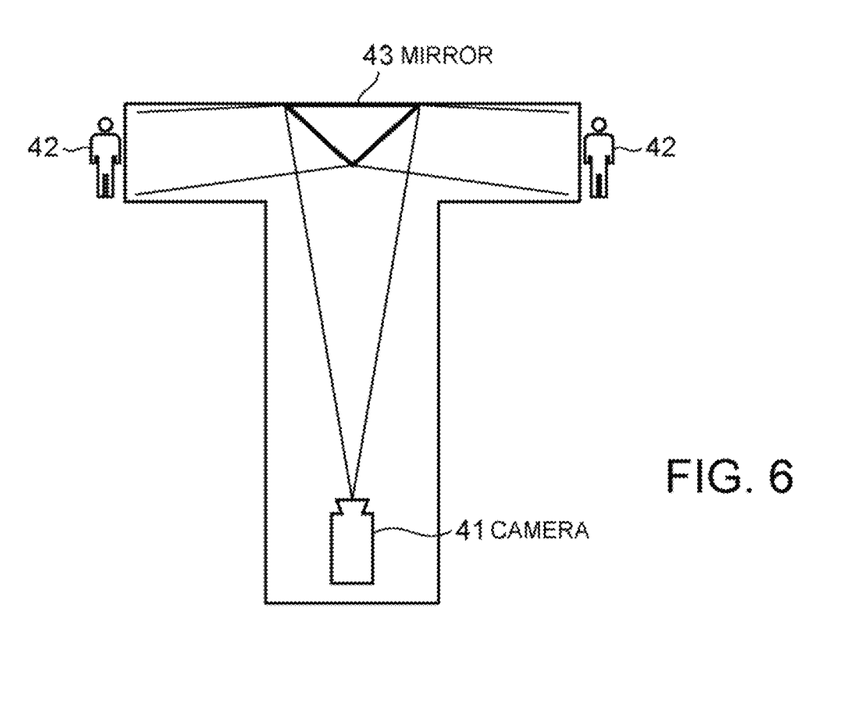
FIG. 6 is an explanatory diagram of an application example of a camera arrangement that uses a mirror.

FIG. 4 to FIG. 6 are each a diagram for illustrating a camera arrangement that uses a mirror.

FIG. 4 is a diagram for illustrating an example in which an image pickup range of a camera 21 is limited to a mirror 23 so that the camera 21 receives light reflected by the mirror 23 to photograph the person to be photographed 22.

FIG. 5 is a diagram for illustrating an example in which a wide range including a mirror 33 is photographed from a camera 31. In other words, FIG. 5 is an explanatory diagram for illustrating a camera arrangement that uses the mirror 33 and allows face authentication to be performed from a plurality of directions.

FIG. 6 is a diagram for illustrating an example in which a triangular mirror 43 is used to allow a camera 41 to photograph persons to be photographed 42 existing on both sides of the mirror 43. In other words, FIG. 6 is an explanatory diagram of an application example of a camera arrangement that uses the mirror 43.

Figure 7:
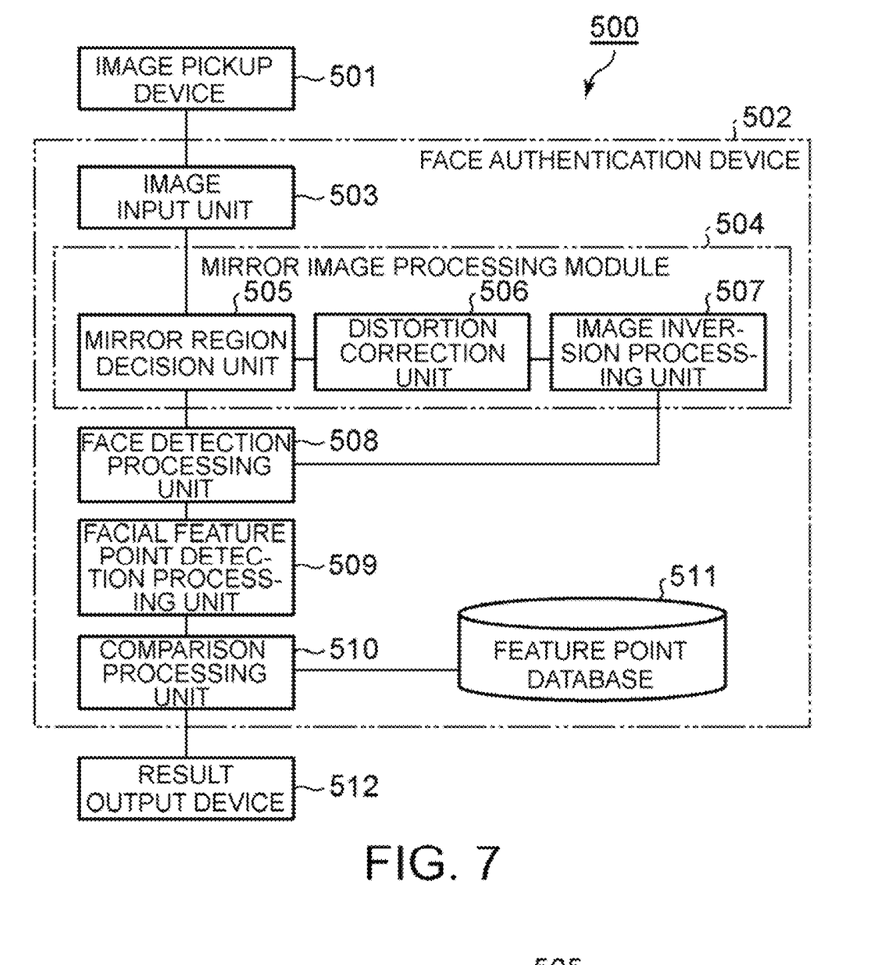
FIG. 7 is a block diagram of a face authentication system in one embodiment of this invention.

FIG. 7 is a block diagram for illustrating a configuration of a face authentication system 500 in the first example of this invention. The face authentication system 500 illustrated in FIG. 7 comprises an image pickup device 501, a face authentication device 502, and a result output device 512.

The face authentication device 502 is implemented by adding a mirror image processing module 504 to a general face authentication device.

To describe more specifically, the face authentication device 502 includes an image input unit 503, the mirror image processing module 504, a face detection processing unit 508, a facial feature point detection processing unit 509, a comparison processing unit 510, and a feature point database 511.

In the face authentication device 502, first, the image input unit 503 receives, as an input image, an image picked up by the image pickup device 501. The mirror image processing module 504 reads the input image received by the image input unit 503. After the input image is processed by the mirror image processing module 504, the face detection processing unit 508 cuts out a face image from the processed image. The facial feature point detection processing unit 509 extracts a feature point of the cut-out face image. The comparison processing unit 510 compares the extracted feature point with a reference feature point registered with the feature point database 511. The comparison processing unit 510 then produces a result of the face authentication to the result output device 512.

The mirror image processing module 504 includes a mirror region decision unit 505, a distortion correction unit 506, and an image inversion processing unit 507.

Figure 8:
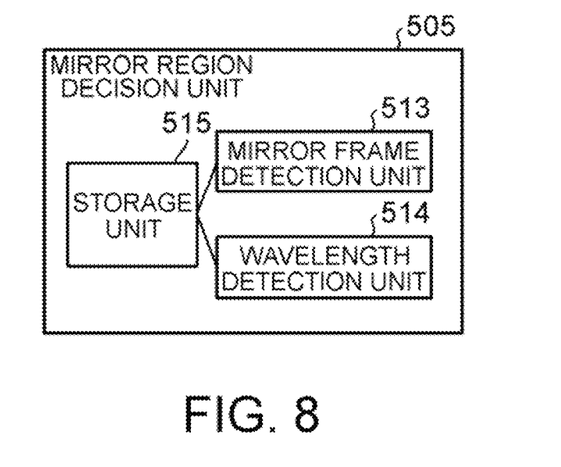
FIG. 8 is a block diagram of a mirror region determination unit to be used in the face authentication system illustrated in FIG. 7.

As illustrated in FIG. 8, the mirror region decision unit 505 includes any one of a mirror frame detection unit 513 and a wavelength detection unit 514. The mirror region decision unit 505 further includes a storage unit 515. The storage unit 515 stores settings for detection and the mirror region.

Figure 9:
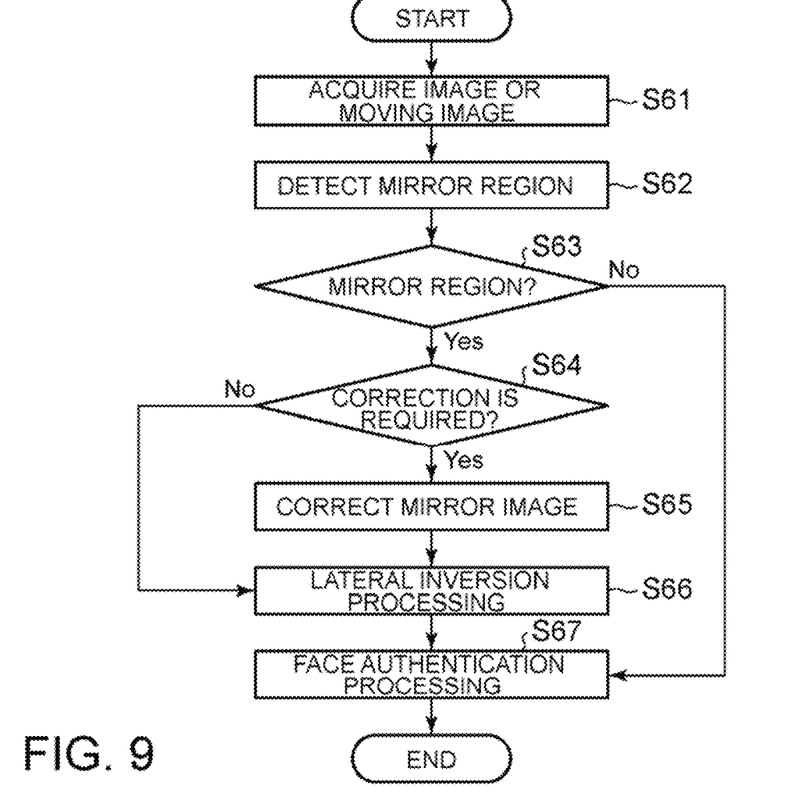
FIG. 9 is a flowchart of face authentication to be performed in the face authentication system illustrated in FIG. 7 to which this invention is applied.

Next, referring to FIG. 9 and FIG. 10, a description will be given of an operation of the face authentication system 500 illustrated in FIG. 7 and FIG. 8. FIG. 9 is a flowchart of face authentication, and FIG. 10 is a flowchart of mirror region detection.

First, the image input unit 503 acquires from the image pickup device 501 an image signal of an image (still image) or a moving image (Step S61). The mirror region decision unit 505 extracts a mirror region from the acquired image signal of the image (still image) or the moving image (Step S62).

Figure 10:
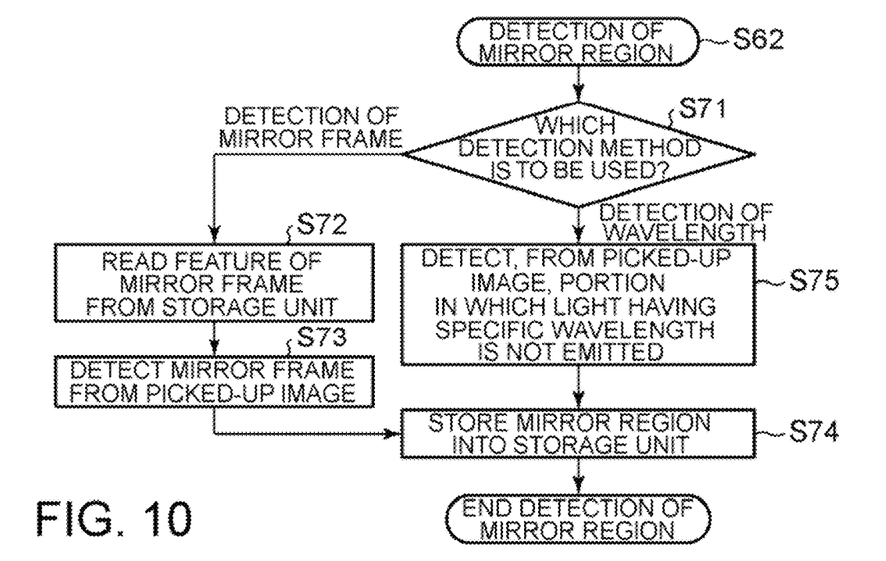
FIG. 10 is a flowchart of mirror region detection.

Referring to FIG. 10, decision of a mirror region (detection of a mirror region) will be described. The mirror region decision (mirror region detection) in the mirror region decision unit 505 is performed by any one of the mirror frame detection unit 513 and the wavelength detection unit 514.

The mirror region decision unit 505 specifies in advance a detection method to be used (Step S71).

When the mirror frame detection unit 513 is to be used, it is required to mount a frame to the mirror in advance.

It is assumed that the mirror region decision unit 505 determines in Step S71 that the mirror frame detection unit 513 is to be used. In this case, the mirror frame detection unit 513 reads from the storage unit 515 a feature, for example, a color, of the mirror frame (Step S72) to detect the inside of the frame as a mirror region (Step S73). The mirror frame detection unit 513 stores the detected mirror region into the storage unit 515 (Step S74), and passes the region to the distortion correction unit 506.

When the wavelength detection unit 514 is to be used, a filter that does not reflect a specific wavelength, for example, an infrared cut film, is attached to the mirror, and a camera capable of capturing a specific wavelength, for example, a visible light-infrared camera, is used. A portion in which the cut film is attached does not emit light having the specific wavelength.

It is assumed that the mirror region decision unit 505 determines in Step S71 that the wavelength detection unit 514 is to be used. In this case, the wavelength detection unit 514 detects from the picked-up image a portion from which light having the specific wavelength is not emitted (Step S75), and stores the detected portion into the storage unit 515 as a mirror region (Step S74). After that, the wavelength detection unit 514 cuts out the mirror region from an input image picked up by a visible light camera, and passes the cut-out mirror region to the distortion correction unit 506.

Referring back to FIG. 9, the mirror region decision unit 505 decides whether or not a relevant region is the mirror region (Step S63).

When the mirror region decision unit 505 decides that the relevant region is the mirror region (Yes in Step S63), the mirror image processing module 504 determines whether or not correction of distortion or expansion is required to be performed on a region detected as the mirror region (Step S64). When it is determined that correction is required (Yes in Step S64), the distortion correction unit 506 corrects the mirror image (Step S65). Whether or not to perform correction is determined based on whether or not a distortion correction value is set in advance in the storage unit 515. Distortion correction is not performed in normal cases, but is performed mainly when an angle of a camera with respect to a mirror is small or when a special mirror, for example, a convex mirror, is used.

The distortion correction value is determined before the face authentication flow of FIG. 9. Next, the determination of the distortion correction value will be described.

Figure 11:
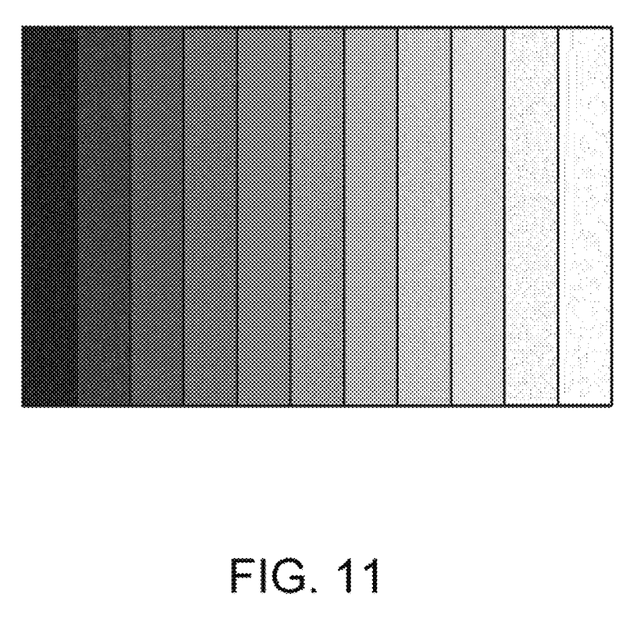
FIG. 11 is a diagram for illustrating an example of an image for correction.

Before the face authentication, such an image for correction as illustrated in FIG. 11 is enlarged, and is reflected by the entire mirror. The camera picks up the reflected image of the image for correction, and a processing device (not shown) compares the reflected image with the original image and performs reverse calculation, to thereby calculate a correction parameter representative of a deformation difference from the original image. The processing device stores the correction parameter into the storage unit 515, and distorts an image based on the correction parameter when correcting distortion of the image.

Referring back to FIG. 9, after the processing by the distortion correction unit 506, the image inversion processing unit 507 performs lateral inversion processing (Step S66). After that, a combination of the face detection processing unit 508, the facial feature point detection processing unit 509, and the comparison processing unit 510 performs face authentication processing on a region decided by the mirror region decision unit 505 as a region other than the mirror and on the region processed by the mirror image processing module 504 (Step S67). Finally, the comparison processing unit 510 produces a result of the authentication to the result output device 512.

Therefore, the combination of the face detection processing unit 508, the facial feature point detection processing unit 509, and the comparison processing unit 510 serves as the face authentication processing unit 216 (see FIG. 2) configured to perform face authentication processing.

Next, effects of the first example will be described.

In a case of normal face authentication, a camera is installed at the position of the mirror 23 (FIG. 4), and hence an angular difference between the person to be photographed 22 and the camera in a vertical direction is disadvantageously increased.

In contrast, in the first example, the distance between the camera 21 and the mirror 23 is added to the distance between the person to be photographed 22 and the mirror 23. As a result, the distance between the camera 21 and the person to be photographed 22 (photographing distance) is increased, and hence it is possible to reduce the angular difference in the vertical direction.

Further, in the case of such an installation as illustrated in FIG. 5 in which the mirror is contained in the image picked up by the camera 31, a normal camera image is subjected to a normal face authentication process, whereas an automatically detected mirror region is subjected to the face authentication after being subjected to distortion correction and lateral inversion processing. This consequently enables face authentication processing from a plurality of points to be performed in a manner close to the actual processing from a plurality of points, and hence a probability of capturing a front image of a face increases. With this, increase in detection rate is expected in face authentication for monitoring, for example, detection of a suspicious person. Further, a mirror region is subjected to lateral inversion processing, which eliminates the necessity to register a laterally-inverted face image with the feature point database 511 for face images. It is therefore possible to reduce the storage capacity of the database.

Through installation of a special mirror such as the triangular mirror 43 or a convex mirror as illustrated in FIG. 6, the camera 41 is allowed to pick up images in a plurality of directions. It is therefore possible to implement face authentication for monitoring in a narrow floor or passage in which the camera cannot be installed.

The respective components of the face authentication device 502 are only required to be implemented through use of a combination of hardware and software. In a mode in which hardware and software are combined, a face authentication program is loaded onto a random access memory (RAM), and a control unit (central processing unit (CPU)) and other hardware are caused to operate based on the face authentication program, to thereby implement each component as corresponding means. Further, the face authentication program may be recorded in a recording medium for distribution. The face authentication program recorded in the recording medium is read into a memory in a wired or wireless manner, or via the recording medium itself, to cause the control unit and the like to operate. Examples of the recording medium include an optical disc, a magnetic disk, a semiconductor memory device, and a hard disk.

When the above-mentioned example is described in another expression, the example can be implemented by causing a computer, which is to be caused to operate as the face authentication device 502, to operate as the image input unit 503, the mirror image processing module 504, the face detection processing unit 508, the facial feature point detection processing unit 509, and the comparison processing unit 510 based on the face authentication program loaded on the RAM.

Next, other examples of this invention will be described.

In such a case as illustrated in FIG. 4, a filter configured to transmit only a specific wavelength therethrough, for example, an infrared transmission filter, may be attached to the mirror 23, and the camera 21 configured to capture the specific wavelength may be used. With this, visible light is cut off, which inhibits the person to be photographed 22 from recognizing the camera 21 reflected by the mirror 23. It is therefore possible to reduce a psychological stress on the person to be photographed 22.

In the mirror region detection, a mirror may be subjected to surface treatment to be formed into, for example, a Chinese magic mirror, and a region subjected to the surface treatment may be detected as a mirror region.

In the mirror region detection, a polarization filter may be attached to a mirror to polarize reflected light so that a region of polarized light may be detected as a mirror region.

The mirror region detection and distortion correction may be set manually as well as automatically.

The mirror region detection and distortion correction may be set automatically through use of machine learning.

In such a camera arrangement as illustrated in FIG. 5, when the distance between a real image and a mirror reflected image that are picked up by the camera 31 is too large, a case in which one of the images is out of focus is conceivable. In this case, a function of adjusting focus may be added to the mirror in order to adjust focus, or a camera capable of adjusting focus after photographing, such as a light-field camera or a lensless camera, may be used to acquire an image.

In the image picked up by the camera, only the mirror region may be subjected to face authentication.

In the above, the example embodiment and the examples of this invention are described in detail with reference to the drawings. It is to be noted, however, that a person skilled in the art can employ other similar example embodiments and examples, and can perform change or addition of modes as appropriate without departing from this invention.

The whole or part of the example embodiments and the examples described above can be described as, but not limited to, the following supplementary notes.

(Supplementary Note 1)

A face authentication device, which is configured to perform face authentication based on an input image picked up by an image pickup device, the input image including a mirror region reflected by a mirror, the face authentication device comprising:
  a database with which, for each face of a person to be authenticated, only one real front image is to be registered as a reference face image;
  a mirror image processing circuitry configured to detect the mirror region from the input image and to subject a detected mirror region to lateral inversion processing to produce a processed image;
  a face detection processing circuitry configured to detect a face image from the processed image to generate a detected face image; and
  a face authentication processing circuitry configured to compare the detected face image with the reference face image, to thereby perform face authentication.

(Supplementary Note 2)

The face authentication device according to Supplementary Note 1, wherein the mirror image processing circuitry includes a mirror region decision circuitry configured to decide the mirror region from the input image.

(Supplementary Note 3)

The face authentication device according to Supplementary Note 2,
  wherein the mirror has a mirror frame mounted thereto in advance, and
  wherein the mirror region decision circuitry includes:

a storage configured to store a feature of the mirror frame as a stored feature; and a mirror frame detection circuitry configured to detect the mirror region from the input image based on the stored feature.

(Supplementary Note 4)

The face authentication device according to Supplementary Note 2, wherein the mirror has attached thereto a cut film configured to avoid reflecting a specific wavelength, and wherein the mirror region decision circuitry includes a wavelength detection circuitry configured to detect from the input image, as the mirror region, a portion in which light having the specific wavelength is inhibited from being reflected.

(Supplementary Note 5)

The face authentication device according to any one of Supplementary Notes 1 to 4, wherein the mirror image processing circuitry further includes a distortion correction circuitry configured to correct distortion of the mirror region.

(Supplementary Note 6)

A face authentication method for performing face authentication based on an input image including a mirror region reflected by a mirror, the face authentication method comprising:
registering, for each face of a person to be authenticated, only one real front image with a database as a reference face image;
subjecting the mirror region of the input image to lateral inversion processing to produce a processed image;
detecting a face region from the processed image to generate a detected face image; and
comparing the detected face image with the reference face image, to thereby perform face authentication.

(Supplementary Note 7)

The face authentication method according to Supplementary Note 6, wherein the subjecting the mirror region of the input image to lateral inversion processing includes deciding the mirror region from the input image.

(Supplementary Note 8)

The face authentication method according to Supplementary Note 7, wherein the mirror has a mirror frame mounted thereto in advance, and wherein the deciding includes:
storing a feature of the mirror frame in a storage as a stored feature; and
detecting the mirror region from the input image based on the stored feature.

(Supplementary Note 9)

The face authentication method according to Supplementary Note 7, wherein the mirror has attached thereto a cut film configured to avoid reflecting a specific wavelength, and wherein the deciding includes detecting from the input image, as the mirror region, a portion in which light having the specific wavelength is inhibited from being reflected.

(Supplementary Note 10)

The face authentication method according to any one of Supplementary Notes 6 to 9, wherein the subjecting the mirror region of the input image to lateral inversion processing further includes correcting distortion of the mirror region.

(Supplementary Note 11)

A non-transitory computer readable recoding medium storing a face authentication program for causing a computer to execute face authentication based on an input image including a mirror region reflected by a mirror, the face authentication program causing the computer to execute:

a registration procedure of registering, for each face of a person to be authenticated, only one real front image with a database as a reference face image;

a mirror image processing procedure of subjecting the mirror region of the input image to lateral inversion processing to produce a processed image;

a face detection processing procedure of detecting a face region from the processed image to generate a detected face image; and a face authentication processing procedure of comparing the detected face image with the reference face image, to thereby perform face authentication.

(Supplementary Note 12)

The non-transitory computer readable recording medium according to Supplementary Note 11, wherein the mirror image processing procedure includes a mirror region decision procedure of causing the computer to decide the mirror region from the input image.

(Supplementary Note 13)

The non-transitory computer readable recording medium according to Supplementary Note 12, in which the mirror has a mirror frame mounted thereto in advance, and in which the mirror region determination procedure includes:
a procedure of causing the computer to store a feature of the mirror frame in a storage; and
a mirror frame detection procedure of causing the computer to detect the mirror region from the input image based on the stored feature of the mirror frame.

(Supplementary Note 14)

The non-transitory computer readable recording medium according to Supplementary Note 12, in which the mirror has attached thereto a cut film configured to avoid reflecting a specific wavelength, and in which the mirror region determination procedure includes a wavelength detection procedure of causing the computer to detect from the input image a portion in which light having the specific wavelength is inhibited from being reflected as the mirror region.

(Supplementary Note 15)

The non-transitory computer readable recording medium according to any one of Supplementary Notes 11 to 14, in which the mirror image processing procedure further includes a distortion correction procedure of causing the computer to correct distortion of the mirror region.

What is claimed is:

1. A face authentication device, which is configured to perform face authentication based on an input image including a mirror region corresponding to a mirror and a frame mounted on the mirror, the face authentication device comprising:
a memory storing instructions; and
one or more processors coupled to the memory, wherein the one or more processors are configured to execute the instructions to:
store, for a plurality of faces of persons to be authenticated, one real front image as a reference face image; and
perform face authentication processing from at least one of a plurality of directions, wherein the one or more processors are further configured to execute the instructions to perform the face authentication processing from a first direction based on a detection of the mirror by:
retrieving a color of the frame mounted on the mirror from a storage;
detecting a region inside of the frame of the mirror based on the color of the frame as the mirror region in the input image and produce a mirror image from the detected mirror region;
performing lateral inversion processing on the mirror image to produce a processed image;
comparing the processed image with a portion of the reference face image corresponding to the mirror region; and
performing the face authentication from the first direction based on a match between the processed image and the reference face image, and outputting a face authentication result, and
wherein the one or more processors are further configured to execute the instructions to perform the face authentication processing from a second direction without using the mirror by:
detecting a subject in the input image without performing the lateral inversion processing; and
performing the face authentication from the second direction based on a match between the subject in the input image and the reference face image, and outputting a face authentication result from the second direction.

2. A face authentication device according to claim 1, the one or more processors are further configured to execute the instructions to:
correct distortion of the mirror image to produce a corrected mirror image, wherein
the lateral inversion processing is executed on the corrected mirror image to produce the processed image.

3. A face authentication device according to claim 2, wherein
correcting distortion of the mirror image is performed based on a predetermined correction parameter.

4. A face authentication device according to claim 1, wherein the one or more processors are configured to execute the instructions to detect the inside of the frame of the mirror using a color of the frame as the mirror region in the input image.

5. A face authentication method for performing face authentication based on an input image including a mirror region corresponding to a mirror and a frame mounted on the mirror, the face authentication method comprising:
performing face authentication processing from at least one of a plurality of directions,
wherein the performing the face authentication processing comprises performing the face authentication processing from a first direction based on a detection of the mirror by:
retrieving a color of the frame mounted on the mirror from a storage;
detecting a region inside of the frame of the mirror based on the color of the frame as the mirror region in the input image and producing a mirror image from the detected mirror region;
performing lateral inversion processing to produce a processed image;
comparing the processed image with a portion of a reference face image corresponding to the mirror region, wherein the reference face image is one real front image for a plurality of faces of persons to be authenticated; and
performing the face authentication from the first direction based on a match between the processed image and the reference face image, and outputting a face authentication result,
wherein the performing the face authentication processing further comprises performing the face authentication processing from a second direction without using the mirror by:
detecting a subject in the input image without performing the lateral inversion processing; and
performing the face authentication from the second direction based on a match between the subject in the input image and the reference face image, and outputting a face authentication result from the second direction.

6. A face authentication method according to claim 5, further comprising:
correcting distortion of the mirror image to produce a corrected mirror image, wherein
the lateral inversion processing is executed on the corrected mirror image to produce the processed image.

7. A face authentication method according to claim 6, comprising:
correcting distortion of the mirror image is performed based on a predetermined correction parameter.

8. A face authentication method according to claim 5, wherein the detecting is to detect the inside of the frame of the mirror using a color of the frame as the mirror region in the input image.

9. A non-transitory computer readable medium storing a face authentication program causing a computer to execute face authentication based on an input image including a mirror region corresponding to a mirror, the face authentication program causing the computer to execute a face authentication process comprising:
performing face authentication processing from at least one of a plurality of directions,
wherein the performing the face authentication processing comprises performing the face authentication processing from a first direction based on a detection of the mirror by:
retrieving a color of the frame mounted on the mirror from a storage;
detecting a region inside of the frame of the mirror based on the color of the frame as the mirror region in the input image and producing a mirror image;
performing the mirror image to lateral inversion processing to produce a processed image;
comparing the processed image with a portion of a reference face image corresponding to the mirror region, wherein the reference face image is one real front image for a plurality of faces of persons to be authenticated;
performing the face authentication from the first direction based on a match between the processed image and the reference face image, and outputting a face authentication result,
wherein the performing the face authentication processing further comprises performing the face authentication processing from a second direction without using the mirror by:
detecting a subject in the input image without performing the lateral inversion processing; and performing the face authentication from the second direction based on a match between the subject in the input image and the reference face image, and outputting a face authentication result from the second direction.

10. The non-transitory computer readable medium according to claim 9, the face authentication process further comprising:

correcting distortion of the mirror image to produce a corrected mirror image, wherein the lateral inversion processing is executed on the corrected mirror image to produce the processed image.

11. The non-transitory computer readable medium according to claim 10, the face authentication process comprising:

correcting distortion of the mirror image is performed based on a predetermined correction parameter.

12. The non-transitory computer readable medium according to claim 9, wherein the detecting is to detect the inside of the frame of the mirror using a color of the frame as the mirror region in the input image.

\* \* \* \* \*